(12) United States Patent
Zelig et al.

(10) Patent No.: US 7,483,399 B2
(45) Date of Patent: Jan. 27, 2009

(54) SIGNALING MPLS OVER RPR RINGS

(76) Inventors: David Zelig, 1 Hadganim Street, Givataim (IL); Leon Bruckman, 3 Degel Reuven Street, Petah Tikva (IL); Yoav Kotser, 78 Jabotinsky Street, Givataim (IL)

(*) Notice: Subject to any disclaimer, the term of this patent is extended or adjusted under 35 U.S.C. 154(b) by 1053 days.

(21) Appl. No.: 10/369,953

(22) Filed: Feb. 20, 2003

(65) Prior Publication Data

US 2003/0227919 A1    Dec. 11, 2003

Related U.S. Application Data

(60) Provisional application No. 60/386,468, filed on Jun. 5, 2002.

(51) Int. Cl.
*H04L 12/28* (2006.01)
(52) U.S. Cl. .................. 370/258; 370/392; 370/522
(58) Field of Classification Search .................. None
See application file for complete search history.

(56) References Cited

U.S. PATENT DOCUMENTS

| | | | |
|---|---|---|---|
| 5,235,593 A | 8/1993 | Grow et al. ............... 370/85.5 |
| 6,205,488 B1 | 3/2001 | Casey et al. | |
| 6,275,493 B1 | 8/2001 | Morris et al. | |
| 6,314,110 B1* | 11/2001 | Chin et al. ............... 370/468 |
| 6,339,595 B1 | 1/2002 | Rekhter et al. | |
| 6,408,001 B1 | 6/2002 | Chuah et al. | |
| 6,507,577 B1 | 1/2003 | Mauger et al. ............. 370/356 |
| 6,510,141 B1 | 1/2003 | Ramfelt et al. ............ 370/254 |
| 6,522,627 B1 | 2/2003 | Mauger ..................... 370/230 |
| 6,563,793 B1 | 5/2003 | Golden et al. | |
| 6,604,136 B1 | 8/2003 | Chang et al. | |
| 6,628,624 B1 | 9/2003 | Mahajan et al. | |
| 6,760,775 B1 | 7/2004 | Anerousis et al. | |
| 6,765,921 B1 | 7/2004 | Stacey et al. | |
| 6,778,494 B1 | 8/2004 | Mauger ..................... 370/230 |
| 6,778,496 B1 | 8/2004 | Meempat et al. | |

(Continued)

FOREIGN PATENT DOCUMENTS

EP    105 2808 A1    11/2000

(Continued)

OTHER PUBLICATIONS

Kompella et al. "Signalling Unnumbered Links in RSVP-TE", Feb. 2001. Download from <http://www3.ietf.org/proceedings/01aug/I-D/draft-ietf-mpls-rsvp-unnum-01.txt>.*

(Continued)

*Primary Examiner*—Michael J Moore, Jr.

(57) ABSTRACT

Explicit routing of network traffic over RPR rings using MPLS signaling techniques, including unnumbered links. A modified LSP_TUNNEL_INTERFACE_ID object is provided with a RPR IP address instead of the conventional LSR Router ID, and with a direction indicator in place of the conventional interface ID. A novel subobject is included in the ERO and RRO, which holds the RPR IP address of the sending node in place of the conventional router ID, and a direction indicator in place of the conventional interface ID. The network nodes inspect the directional indicator that is received in a path message or a Resv message to determine the direction in which traffic is to be sent and received in an explicit route.

6 Claims, 4 Drawing Sheets

U.S. PATENT DOCUMENTS

| | | | |
|---|---|---|---|
| 6,886,043 B1 | 4/2005 | Mauger et al. | |
| 6,925,054 B1 | 8/2005 | Atterton et al. | |
| 6,952,395 B1 | 10/2005 | Manoharan et al. | |
| 6,952,397 B2 | 10/2005 | Mor et al. | 370/223 |
| 6,985,447 B2 | 1/2006 | Gibson et al. | |
| 6,992,975 B1 | 1/2006 | Daniel et al. | 370/222 |
| 7,035,279 B2 | 4/2006 | Bruckman | 370/460 |
| 7,042,846 B2 | 5/2006 | Bauer | 370/238 |
| 7,079,544 B2 | 7/2006 | Wakayama et al. | 370/401 |
| 7,133,358 B2 * | 11/2006 | Kano | 370/221 |
| 7,161,899 B2 | 1/2007 | Limaye et al. | 370/223 |
| 7,197,008 B1 | 3/2007 | Shabtay et al. | |
| 7,212,490 B1 * | 5/2007 | Kao et al | 370/222 |
| 7,260,097 B2 * | 8/2007 | Casey | 370/392 |
| 7,283,478 B2 * | 10/2007 | Barsheshet et al. | 370/238 |
| 2001/0032271 A1 | 10/2001 | Allen | |
| 2002/0085548 A1 | 7/2002 | Ku et al. | 370/386 |
| 2002/0176450 A1 | 11/2002 | Kong et al. | |
| 2003/0061338 A1 | 3/2003 | Stelliga | |
| 2003/0103449 A1 * | 6/2003 | Barsheshet et al. | 370/222 |
| 2003/0147352 A1 | 8/2003 | Ishibashi et al. | |
| 2003/0152025 A1 | 8/2003 | Anderson et al. | |
| 2003/0185217 A1 | 10/2003 | Ganti et al. | |
| 2003/0227919 A1 | 12/2003 | Zelig et al. | |
| 2004/0109408 A1 | 6/2004 | Mesh et al. | |
| 2004/0202157 A1 | 10/2004 | Chase et al. | 370/389 |
| 2004/0202171 A1 | 10/2004 | Hama | |
| 2004/0208554 A1 | 10/2004 | Wakai et al. | |
| 2005/0010685 A1 | 1/2005 | Ramnath et al. | |

FOREIGN PATENT DOCUMENTS

| | | |
|---|---|---|
| WO | WO 00/74318 A1 | 12/2000 |

OTHER PUBLICATIONS

Senevirathne, et al., in an IETF draft entitled: "Use of CR-LDP or RSVP-TE to Extend 802.1Q Virtual LANs across MPLS Networks", Oct. 2000. (Available at: search.ietf.org/internet-drafts/draft-tsenevir-8021qmpls-01.txt.).
Awduche, et al., "Requirement for Traffic Engineering Over MPLS", published as IETF RFC 2702, Sep. 1999.
Jogalekar, et al., "IP over Resilient Packet Rings", (Internet Draft, draft-jogalekar-iporpr-00).
Herrera, et al., "A Framework for IP over Packet Transport Rings", (Internet Draft, draft-ietf-iporprframework-00).
Braden, et al., in IETF RFC 2205, "Resource ReServation Protocol (RVSP)—Version 1 Functional Specification", Sep. 1997.
Andersson, et al., in IETF RFC 3036, "LDP Specification" Jan. 2001.
Katz, et al., "Traffic Engineering Extensions to OSPF", (draft-katz-yeung-ospf-traffic-06.txt), Oct. 2001.
Li, et al., "IS-IS Extensions FOR Traffic Engineering", (published as draft-ietf-isis-traffic-04.txt), Aug. 2001.
D. Tsiang et al., Request for Comments (RFC) 2892 of the Internet Engineering Task Force (IETF), Aug. 2000.
"IEEE Standard for Information Technology, Telecommunications and Information Exchange between Systems, Local and Metropolitan Area Network, Common Specifications, Part 3: Media Access Control (MAC) Bridges", Published as ANSI/IEEE Standard 802.1D (1998). Available at: standards.ieee.org/catalog/IEEE802.1.html.
Rosen, et al., in Request for Comments (RFC) 3031 of the Internet Engineering Task Force (IETF), entitled: "Multiprotocol Label Switching Architecture", Jan. 2001. (Available at: www.ietf.org/rfc.html).
Martini, et al., in an IETF Draft Entitled: "Encapsulation Methods for transport of layer 2 Frames over MPLS", May 2001. (Available at: search.ietf.org/internet-drafts/draft-martini-12circuit-encap-mpls-02.txt.).
Martini, et al., Internet Draft, entitled: "Transport of Layer 2 Frames over MPLS", May 2001. (Available at: search.ietf.org/internet-drafts/draft-martini-12circuit-mpls-06.txt.).
Plummer, D., "An Ethernet address Resolution Protocol", RFC 826, Nov. 1982, pp. 1-9.
Finlayson, R. et al, "A Reverse Address Resolution Protocol", RFC 903, Jun. 1984, pp. 1-5.
Yavatkar, R. et al, "Subnet Bandwidth Manager", RFC 2814, May 2000, pp. 1-60.
Malkin, G., "RIP Version 2", RFC 2453, Nov. 1998, pp. 1-39.
Ethernet Technologies, "Ethernet and IEEE 802.3", http://www.cisco.com/univercd/cc/td/doc/cisintwk/ito_doc/ethernet.htm, Jun. 1999, pp. 1-21.
ITU-T Recommendation G.7042/Y.1305, Nov. 2001.
Eric S. Rosen, et al., "An Architecture for L2VPNs", Internet Draft, draft-rosen-ppvpn-12vpn-00.txt, May 2001.
Senevirathne, et al., in an IETF draft entitled: "Distribution of 802.1Q VLAN Information Using BGP 4-MP Extensions", Nov. 2000. (Available at: search.ietf.org/internet-drafts/draft-tsenevir-8021qbgp-00.txt.).
Malis, et al., in an IETF draft entitled: "SONET/SDH Circuit Emulation Service Over MPLS (CEM) Encapsulation", Apr. 2001. (Available at: search.ietf.org/internet-drafts/draft-malis-sonet-ces-mpls-04.txt.).
Townsley, et al., "Layer Two Tunneling Protocol (Version 3) L2TPv3" (IETF draft-ietf-l2tpext-12pt-base-03.txt), Jun. 2002.
Martini, et al., "Encapsulation Methods for Transport of Layer 2 Framws over IP and MPLS Networks", (IETF dratf-martini-ethernet-encap-mpls-01.txt), Jul. 2002.
Deering, "RFC 1112, Host Extensions for IP Multicasting", Aug. 1989.
Tricci So, et al., "Ethernet Pseudo Wire Emulation Edge-to-Edge (PWE3)", (draft-so-pwe3-ethernet.txt), Sep. 2002.
T. Senevirathne, "Virtual Private LAN Service (VPLS) Solution Using GRE Based IP Tunnels", (draft-tsenevir-gre-vpls-00.txt), Feb. 2002.
Prayson Pate, et al., "Framework for Pseudo Wire Emulation Edge-to-Edge (PWE3)", (draft-ietf-pwe3-framework-01.txt), Jun. 2002.
Xipeng Xiao, et al., "Requirements for pseudo-wire emulation edge-to-edge (PWE3)" (draft-ietf-pwe3-requirements-03.txt), Jun. 2002.
W. Augustyn, et al., "Requirements for Virtual Private LAN Services" (draft-augustyn-vpls-requirements-02.txt), Aug. 2002.
Marc Lasserre, et al., "Virtual Private LAN Services Over MPLS" (draft-lasserre-vkompella-ppvpn-vpls-01.txt), Sep. 2002.

* cited by examiner

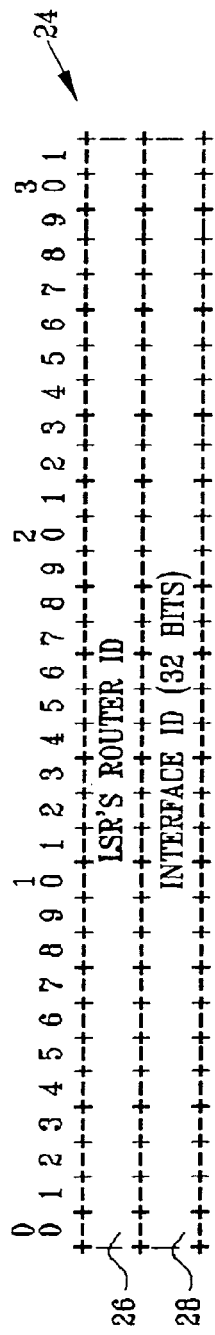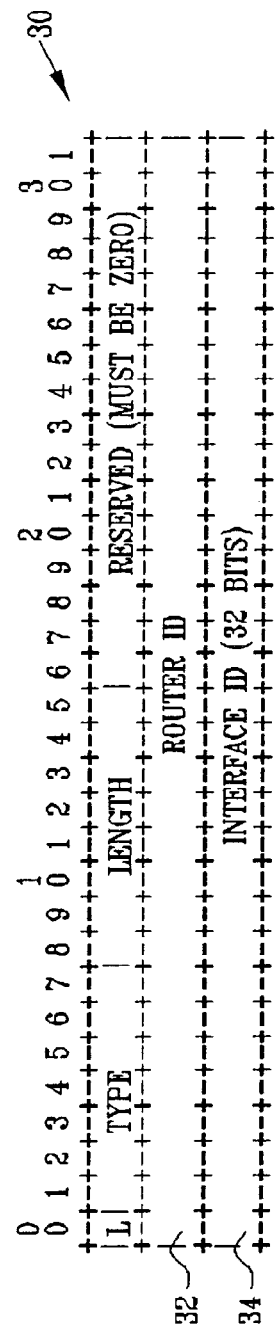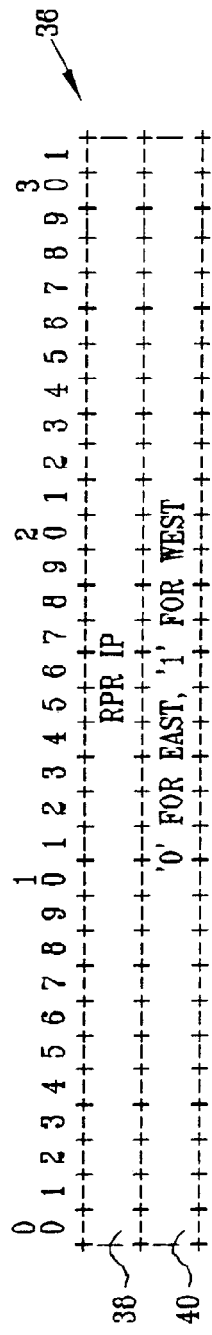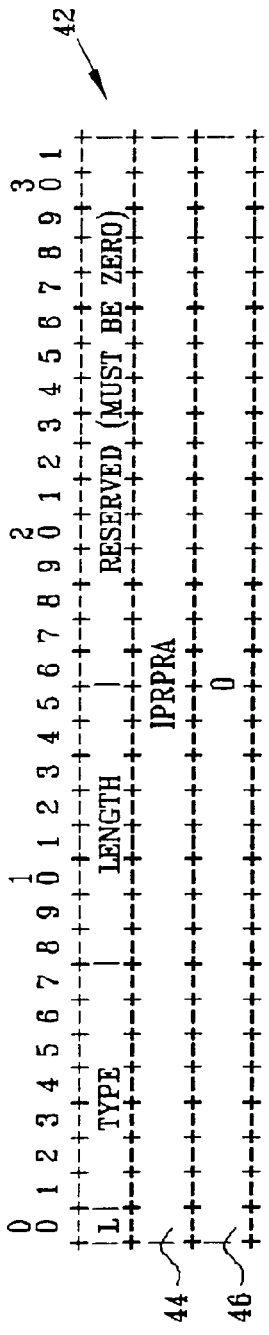
FIG. 2 PRIOR ART
FIG. 3 PRIOR ART
FIG. 4
FIG. 5

SIGNALING MPLS OVER RPR RINGS

CROSS-REFERENCE TO RELATED APPLICATIONS

This Application claims the benefit of Provisional Application No. 60/386,468, filed Jun. 5, 2002.

BACKGROUND OF THE INVENTION

1. Field of the Invention

This invention relates to communications networks. More particularly, this invention relates to methods and systems for improved signaling in communications networks configured as RPR rings and using MPLS techniques.

2. Description of the Related Art

The meanings of acronyms and certain terminology used herein are given in Table 1.

TABLE 1

| | |
|---|---|
| ERO | Explicit route object |
| FEC | Forwarding equivalence class |
| IETF | Internet engineering task force |
| IF | Interface |
| IP | Internet protocol |
| IS-IS | Intermediate Systems-Intermediate Systems Routing Protocol |
| IS-IS-TE | IS-IS enhancements for traffic engineering |
| LDP | Label distribution protocol |
| LSP | Label-switched path |
| LSR | Label-switching router |
| MAC | Media access control |
| MPLS | Multi-protocol label switching |
| MPLS-TE | MPLS traffic engineering |
| OSPF | Open Shortest path First. A routing protocol |
| OSPF-TE | OSPF enhancements used in traffic engineering |
| Resv message | A message carrying a reservation request from a receiver to a sender |
| RFC | Request for comments |
| RPR | Resilient packet rings - a protocol |
| RR | Record route |
| RRO | Record route object |
| RSVP | Resource reservation protocol |
| RSVP-TE | An extension of RSVP, used in traffic engineering |
| SNMP | Simple Network Management Protocol |
| SRP | Spatial reuse protocol |
| TE | Traffic engineering |
| TLV | Type-Length-Value. An encoding scheme |

Multi-protocol label switching is a well-known method for transporting information formatted in multiple protocols using packets. The packets, when entering a MPLS system, are prefixed by one or more tags, called MPLS tags, which are followed by the original packet.

MPLS is described in detail by Rosen et al., in the IETF document, RFC-3031, entitled *Multiprotocol Label Switching Architecture* (January, 2001). This RFC, as well as other IETF REC's cited hereinbelow, is available on the Internet, or from the IETF Secretariat, c/o Corporation for National Research Initiatives, 1895 Preston White Drive, Suite 100, Reston, Va. 20191-5434, USA.

In conventional IP routing, each router along the path of a packet sent through the network analyzes the packet header and independently chooses the next hop for the packet by running a routing algorithm. In MPLS, however, each packet is assigned to a forwarding equivalence class (FEC) when it enters the network, depending on its destination address. The packet receives a short, fixed-length label identifying the FEC to which it belongs. All packets in a given FEC are passed through the network over the same path by label-switching routers (LSRs). Unlike IP routers, label-switching routers simply use the packet label as an index to a look-up table, which specifies the next hop on the path for each FEC and the label that the LSR should attach to the packet for the next hop.

Since the flow of packets along a label-switched path (LSP) under MPLS is completely specified by the label applied at the ingress node of the path, a LSP can be treated as a tunnel through the network. Such tunnels are particularly useful in network traffic engineering, as well as communication security. MPLS tunnels are established by "binding" a particular label, assigned at the ingress node to the network, to a particular FEC. Multiple tunnels may belong to the same FEC, but each tunnel will have its own label binding. In accordance with the conventions of IP networks, tunnels are necessarily unidirectional. In other words, duplex-tunneled communications between a pair of nodes at the edges of a network requires the establishment and binding of two separate, independent tunnels.

MPLS defines a label distribution protocol (LDP) as a set of procedures by which one LSR informs another of the meaning of labels used to forward traffic between and through them. Label distribution protocols are needed in order to set up and bind MPLS tunnels. One example of such a protocol is RSVP-TE, which is available as the IETF document RFC-3209, entitled *RSVP-TE: Extensions to RSVP for LSP Tunnels*. RSVP-TE provides several objects that extend the well-known Resource Reservation Protocol (RSVP), allowing the establishment of explicitly routed LSP's using RSVP as a signaling protocol. RSVP itself is described by Braden et al., in the IETF document RFC-2205, entitled *Resource ReSerVation Protocol (RSVP)—Version* 1 *Functional Specification* (September, 1997). Section 3.10 of this document provides for the definition of new objects and object classes to be used in RSVP signaling, such as those provided by RSVP-TE. Other signaling protocols for setting a LSP are given in the IETF documents RFC-3036, entitled *LDP Specification*, and RFC-3212, entitled *Constraint-Based LSP Setup using LDP.*

LDP is used for hop-by-hop automatic generation of the LSP and is not relevant for traffic engineering applications. RSVP-TE and CR-LDP are both suited for MPLS-TE. MPLS-TE is described in the IETF document RFC-2702, entitled *Requirements for Traffic Engineering Over MPLS*, and includes the capability for selecting an explicit route for the LSP from the source node, adding bandwidth reservations for the LSP along the path, and setting up a protection mechanism.

MPLS and LSP techniques have been employed to some extent in networks having ring configurations. The leading bi-directional protocol for high-speed packet rings is the resilient packet rings (RPR) protocol, which is in the process of being defined as IEEE standard 802.17. Network-layer routing over RPR is described, for example, by Jogalekar et al., in *IP over Resilient Packet Rings* (Internet Draft draft-jogalekar-iporpr-00), and by Herrera et al., in *A Framework for IP over Packet Transport Rings* (Internet Draft draft-ietf-ipoptr-framework-00). A proposed solution for media access control (MAC—protocol layer 2) in bi-directional ring networks is the Spatial Reuse Protocol (SRP), which is described by Tsiang et al., in the IETF document RFC-2892, entitled *The Cisco SRP MAC Layer Protocol*. Using protocols such as these, each node in a ring network can communicate directly with all other nodes through either the inner or the outer ring, using the appropriate Media Access Control (MAC) addresses of the nodes. The terms "inner" and "outer" are used arbitrarily herein to distinguish the different ring traffic directions, as are the terms "east" and "west" and "clockwise" and "counterclockwise." These terms have no physical meaning with respect to the actual configuration of the network.

An explicit route in MPLS is established by providing a list of hops within the LSP in a signaling message of a path signaling protocol, e.g. RSVP or CDR-LDP. Typically the protocol provides options to mandate or exclude particular hops, and to provide for "loose hops", that is, hops in which first and last nodes are specified, but intermediate nodes are not of concern, and are not specified. In this context, the term hop includes any kind of IP address, and can specify a port within a node, or simply indicate the node generally. Interface IP addresses are used when a node has multiple interfaces, and the operator wishes to specify the interface through which the traffic is to pass.

In order to conserve IP addresses, it is recommended that point-to-point interfaces not be assigned an IP address. This is made possible by the use of unnumbered interfaces. The use of unnumbered interfaces for MPLS signaling is described in an IETF draft document *Signalling Unnumbered Links in CR-LDP* (draft-ietf-mpls-crldp-unnum-10. txt, and an IETF draft document *Signalling Unnumbered Links in RSVP-TE* (draft-ietf-mpls-rsvp-unnum-08. txt, both available on the Internet.

The ability to establish explicit routes when using MPLS together with RPR is an important function that is currently unavailable in the art. A RPR MAC on a node has two physical interfaces, "east" and "west", but is assigned a single MAC address and therefore a single IP address. Nodes that are interconnected on a RPR ring behave as a multi-access network from the external perspective of an IP device. However, from the perspective of internal traffic flow, the RPR ring looks like a point-to-point network. In contrast, an Ethernet multi-access LAN appears as a multi-access network from both perspectives.

SUMMARY OF THE INVENTION

When signaling a MPLS path between two nodes on a RPR or a SRP ring, it is possible that different packets of the same traffic entity could be routed in different directions in the ring. In order to establish an explicit route for the traffic, it would be desirable for the network operator to be able select the direction to be followed by a given packet. It would also be desirable for the operator to determine the direction followed by a packet by examination of the RPR record-route object (RR), and to monitor traffic in each direction. Differentiation of direction using IP is not possible, since a RPR interface has one IP address for both physical interfaces. Differentiation of direction using the above-noted unnumbered techniques also is not possible. Unnumbered links as currently known are simply point-to-point links, and their interface identification fields (interface ID's) lack sufficient specification to enable directions to be designated within a RPR ring. Thus, the desired capabilities are not currently available using known techniques.

It is therefore a primary object of some aspects of the present invention to enable explicit routing of network traffic over RPR rings using MPLS signaling techniques.

It is another object of some aspects of the present invention to improve unnumbered interfaces for MPLS signaling.

It is a further object of some aspects of the present invention to enable a node in a RPR ring to evaluate the interface ID of an unnumbered link, which is locally configured for another node of the ring, in order to determine an explicit route of traffic within the ring.

These and other objects of the present invention are attained by initially presenting the RPR link to routing protocols, such as OSPF-TE or IS-IS-TE, as an unnumbered interface. A label-switched path tunnel interface identification (LSP_TUNNEL_INTERFACE_ID) object is provided with a RPR IP address instead of a conventional LSR Router ID, and is provided with a direction indicator in place of a conventional interface ID. Then, using a signaling protocol, a novel subobject is created for the ERO and RRO, which holds the RPR IP address of the sending node in place of the conventional router ID, and holds a direction indicator in place of the conventional interface ID. The network nodes inspect a path message, which contains the directional indicator, in order to determine the direction in which traffic is to be sent. The explicit route selected is indicated in a Resv message.

The invention provides a method for establishing a data-link service between two nodes of a data network that is configured as a ring, such as a RPR or SRP ring, wherein internodal traffic moves around the ring in a first predetermined direction and in a second predetermined direction. The method is carried out by assigning a first local address to a first node of the network and a second local address to a second node thereof, and transmitting a first signaling message from the first node around the ring to the second node in the first predetermined direction. The first signaling message includes the first local address and an indicated interface of the first node for transmitting traffic toward the second node in the first predetermined direction. The method is further carried out by verifying that the first local address of the first signaling message at the second node matches the second local address, and thereafter returning a second signaling message from the second node around the ring to the first node in the second predetermined direction. The second signaling message includes the second local address and an indicated interface of the second node that receives traffic traveling from the first node around the ring in the second predetermined direction.

An aspect of the method includes presenting a link to the network as an unnumbered interface for use in a routing protocol, which can be OSPF-TE or IS-IS-TE.

Another aspect of the method includes disabling a requirement of the second node that the first signaling message must be received via the indicated interface.

In yet another aspect of the method, prior to returning the second signaling message, it is verified that the first signaling message was received at the second node via the indicated interface of the second node.

According to yet another aspect of the method, the first local address and the second local address are RPR IP addresses or SRP IP addresses.

According to a further aspect of the method, the first signaling message includes an unnumbered explicit route object, which is inserted in the first signaling message by the first node.

According to yet another aspect of the method, the first signaling message includes an unnumbered record route object, which is inserted in the first signaling message by the first node.

According to still another aspect of the method, the unnumbered record route object includes the first local address and the indicated interface of the first node.

According to still another aspect of the method, the second signaling message includes an unnumbered record route object, which is inserted in the second signaling message by the second node.

According to an additional aspect of the method, the unnumbered record route object includes the second local address and the indicated interface of the second node.

According to an additional aspect of the method, the first local address and the indicated interface of the first node are carried in fields of a subobject of the explicit route object.

According to one aspect of the method, the ring includes a first ringlet for carrying traffic in the first predetermined direction and a second ringlet for carrying traffic in the second predetermined direction.

The invention provides a communications network, including a first node and a second node configured to operate as label-switched routers to convey traffic therebetween, the first node and the second node are nodes that are disposed along a ring, and respectively have a first local address and a second local address. The first node and the second node each have east and west interfaces with the ring, and are configured such that responsively to a request to initiate a data-link service between the first node and the second node, the first node transmits a first signaling message via one of the east and west interfaces thereof around the ring to the second node. The first signaling message contains an unnumbered explicit route object that includes an indication of a predetermined direction around the link for the data-link service and an identification of the first node. Responsively to the first signaling message, the second node returns a second signaling message via one of the east and west interfaces thereof around the ring to the first node. The second signaling message contains an unnumbered return route object that includes an indication of the east or west interface of the second node, whichever receives traffic moving in the predetermined direction.

According to an additional aspect of the communications network, prior to returning the second signaling message, the second node is further configured to verify that the first signaling message was received at the second node via a designated interface of the first node.

According to still another aspect of the communications network, the first node is adapted to present an unnumbered interface for use with traffic engineering enhancements of a routing protocol.

According to an additional aspect of the communications network, the routing protocol is OSPF-TE or IS-IS-TE.

According to still another aspect of the communications network, the ring is a RPR ring.

According to yet another aspect of the communications network, the first local address and the second local address are RPR IP addresses.

According to one aspect of the communications network, the ring is a SRP ring.

According to another aspect of the communications network, the first local address and the second local address are SRP IP addresses.

According to a further aspect of the communications network, the first local address and the indication of the predetermined direction are carried in fields of a subobject of the explicit route object.

According to another aspect of the communications network, the ring includes a first ringlet for carrying traffic in a first predetermined direction and a second ringlet for carrying traffic in a second predetermined direction.

The invention provides a communications network, including an unnumbered first node and an unnumbered second node configured to operate as label-switched routers to convey traffic therebetween. The first node and the second node are nodes along a ring, and respectively have a first local address and a second local address. The first node and the second node each have east and west interfaces with the ring, and are configured such that responsively to a request to initiate a data-link service between the first node and the second node, the first node transmits a first signaling message via one of the east and west interfaces thereof around the ring to the second node. The first signaling message contains a label-switched path tunnel interface identification object and has an indicator of a predetermined direction for traffic of the data-link service traveling around the ring and an identification of the first node.

The invention provides a method for establishing a data-link service between two nodes of a data network that is configured as a ring, which is carried out by configuring an unnumbered first node and an unnumbered second node to operate as label-switched routers to convey traffic therebetween. The first node and the second node are nodes along the ring, and respectively have a first local address and a second local address. The first node and the second node each have east and west interfaces with the ring. The method is further carried out by responsively to a request to initiate the data-link service, by transmitting a first signaling message via one of the east and west interfaces of the first node around the ring to the second node, wherein the first signaling message contains a label-switched path tunnel interface identification object that has an indicator of a predetermined direction for traffic of the data-link service traveling around the ring and an identification of the first node.

BRIEF DESCRIPTION OF THE DRAWINGS

For a better understanding of these and other objects of the present invention, reference is made to the detailed description of the invention, by way of example, which is to be read in conjunction with the following drawings, wherein like elements are given like reference numerals, and wherein:

FIG. 2 is a diagram of a LSP_TUNNEL_INTERFACE_ID object according to the prior art;

FIG. 3 is a diagram of a subobject of an ERO that is used to specify unnumbered links according to the prior art;

FIG. 4 is a diagram of a LSP_TUNNEL_INTERFACE_ID object, which is constructed and operative in accordance with a disclosed embodiment of the invention to serve as a RPR interface identifier;

FIG. 5 is a diagram of a subobject of an ERO, which is constructed and operative in accordance with a disclosed embodiment of the invention;

DETAILED DESCRIPTION OF THE INVENTION

Figure 1:
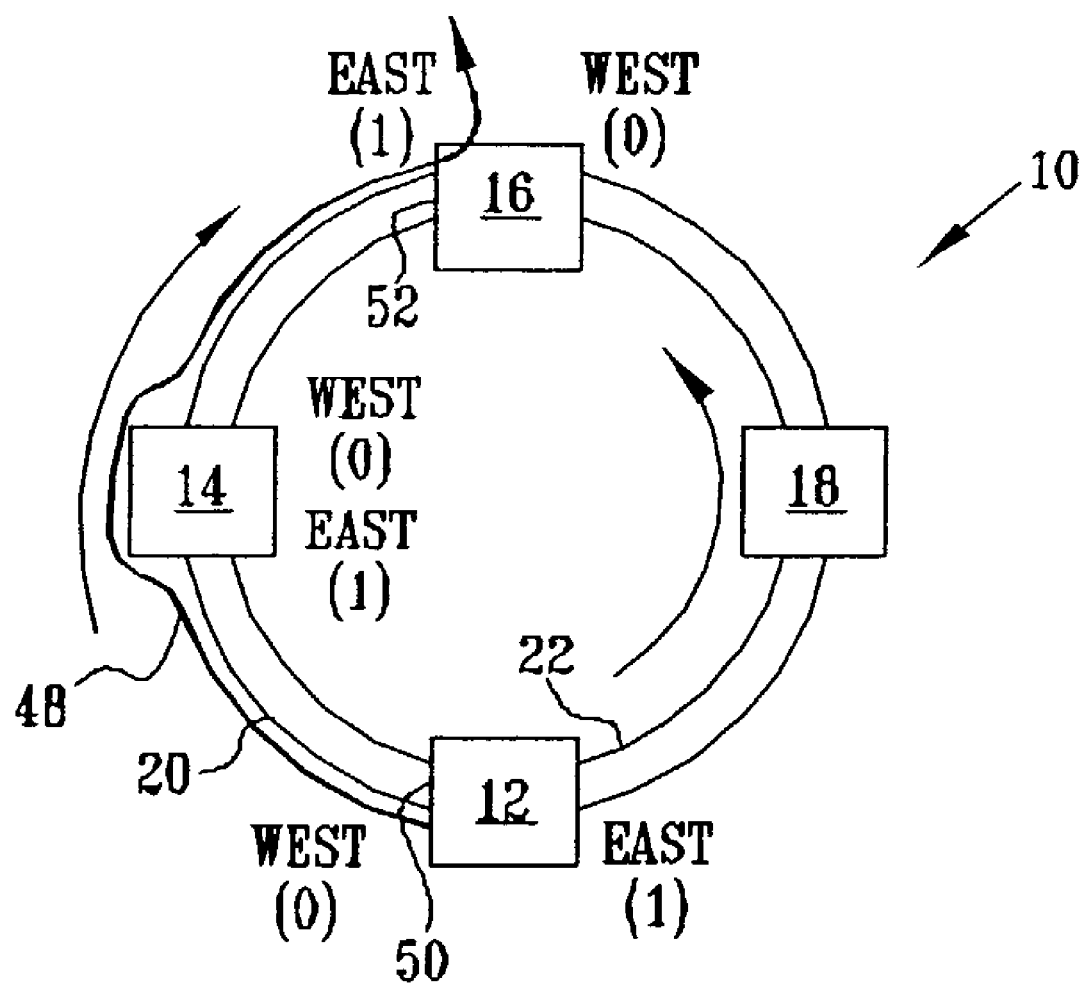
FIG. 1 is a diagram of a RPR network that is constructed and operative in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Overview.

In an explicit route, for example in RSVP, a RSVP signaling packet must be received from the interface that is specified in an ERO, which is defined in the above-noted document RFC-3209. Otherwise, an error occurs, and the packet is discarded. This restriction may be disabled in the case of RPR rings. It is convenient, and sometimes essential to send control traffic only in one direction through the ring.

A brief comment on unnumbered link terminology will facilitate understanding of the invention herein. In an unnumbered link between LSR's A and B. LSR A and LSR B each choose an identifier for that link. From the perspective of LSR A, the identifier assigned by LSR A to the link is referred to as the "link local identifier", or simply the local identifier, and the identifier assigned by LSR B to the link is referred to as the "link remote identifier" or simply "remote identifier". The interfaces of LSR A and LSR B to the link are referred to as the local and remote interface, respectively.

Likewise, from the perspective of LSR B, the identifiers assigned by LSR B and LSR A to the link are referred to as the local identifier and the remote identifier, respectively. The interfaces of LSR B and LSR A to the link are referred to as the local and remote interface, respectively.

In RPR it is assumed that sending a packet to the "east" implies that the packet leaves the sending node via its east interface, and the destination node receives the packet from the "west", via its west interface. This assumption simplifies the processing of the interface ID's.

A single IP address is assigned for each RPR MAC, as is presently done in the case of multi-access IP connectivity. A constant unnumbered indication is provided in a subobject of the ERO or a RRO that specifies the use of either the east or the west interface of the RPR MAC, which is equivalent to specifying the use of the eastbound or the westbound ringlet and thus equivalent to specifying a particular direction in which traffic is moving. This avoids negotiating local and remote interface ID's. Finally, instead of providing a router ID, as in the conventional unnumbered IP protocol, the ERO and RRO each include a modified subobject that contains the RPR IP address.

The path message used for establishing a LSP forwarding adjacency includes an unnumbered route object, that is an ERO, RRO (or both), that was inserted by the sender node. As noted above, this route object includes an indication of the desired traffic direction in the case of an ERO and the actual path taken in the case of a RRO. The node that receives the path message ignores the actual side from which the packet was received, and instead processes the path message responsively to the indication in the route object. A Resv message is returned with a RRO, which is also modified in the same manner as the route object of the path message, and which contains an indication of the interface that was stipulated in the path message.

The above-described technique is applicable to both RSVP-TE and CR-LDP. Except as noted, the ERO and RRO are otherwise processed as described in the above-noted documents, *Signalling Unnumbered Links in CR-LDP*, and *Signalling Unnumbered Links in RSVP-TE*, as the case may be.

The invention can be carried out using either strict RSVP processing, in which a node must consider the direction from which a signaling packet is received, or loose RSVP processing, in there is no such consideration. The invention can be practiced in configurations that employ constant settings for the interface ID's, or in configurations in which they can be varied.

EXAMPLE 1

(RSVP-TE)

Reference is now made to FIG. 1, which is a diagram of a SRP or a RPR network 10 that is constructed and operative in accordance with a disclosed embodiment of the invention. The embodiments herein are primarily disclosed with reference to RPR networks, but are adaptable to SRP networks by those skilled in the art. The network 10 has nodes 12, 14, 16, 18, which are connected by an outer clockwise-directed ringlet 20 for eastbound traffic, and an inner counterclockwise-directed ringlet 22 for westbound traffic. The traffic flows in the clockwise-directed ringlet 20 and the counterclockwise-directed ringlet 22 are indicated by clockwise and counterclockwise arrows respectively.

There are constant index settings in the node interfaces of the network 10, in which the values 0 and 1 indicate a west interface and an east interface, respectively. This convention is assumed to be known to all the nodes 12, 14, 16, 18. In addition, each of the nodes 12, 14, 16, 18 is assigned an IP address. As noted above, the IP address is common to both the node's east and west interfaces. Furthermore, all of the IP addresses representing the RPR interfaces within the network 10 must be in a common IP subnet. If desired, each of the nodes 12, 14, 16, 18 may be additionally assigned a router ID address and may also have additional interfaces. While the router ID address and the additional interfaces are not needed to carry out the invention, they do not interfere.

Reference is now made to FIG. 2, which is a diagram of a LSP_TUNNEL_INTERFACE_ID object 24, which is specified in the above-noted document, *Signalling Unnumbered Links in RSVP-TE*. The LSP_TUNNEL_INTERFACE_ID object 24 represents the LSP as a virtual interface for the purpose of traffic engineering, and can appear in either a path message or a Resv message. In the former case, it is sometimes known as the forward interface ID; in the latter case, it is sometimes known as the reverse interface ID. The LSP_TUNNEL_INTERFACE_ID object 24 is also used to represent an actual interface or a virtual interface in other traffic engineering tools, such as OSPF-TE.

The LSP_TUNNEL_INTERFACE_ID object 24 includes fields for a LSR router ID 26 and an interface ID 28. The LSR router ID 26 is usually the host IP address of the LSR sending an ERO. The interface ID 28 is a local identifier assigned by this router to the interface. The local identifier is typically an ifIndex of the well-known network management protocol SNMP, but may be any local assigned number.

Reference is now made to FIG. 3, which is a diagram of a subobject 30 of a conventional ERO that is used to specify unnumbered links, which in a LSP are typically represented as virtual interfaces. The subobject 30 is described in the above-noted document, *Signalling Unnumbered Links in RSVP-TE*, and includes fields for a router ID 32 and an interface ID 34. The interface ID 34 is an identifier that is assigned to a link by the LSR specified by the router ID 32. Conventionally, the subobject 30 and the LSP_TUNNEL_INTER-FACE_ID object 24 (FIG. 2) are included in an ERO that is sent in a path message.

Reference is now made to FIG. 4, which is a diagram of a LSP_TUNNEL_INTERFACE_ID object 36 that is constructed and operative in accordance with a disclosed embodiment of the invention. The LSP_TUNNEL_INTERFACE_ID object 36 includes fields for a RPR IP address 38, which replaces the LSR Router ID 26 and a direction indicator 40, which replaces the interface ID 28 (FIG. 2). The values 0 and 1 of the direction indicator 40 indicate westerly and easterly directions respectively. It will be understood that this convention is exemplary, and many different values could be used for direction designation. As noted above, the meanings of the values of the direction indicator 40 are known to all nodes in the network 10 (FIG. 1). The LSP_TUNNEL_INTERFACE_ID object 36 is used to represent the RPR interface in traffic engineering tools, such as OSPF-TE or IS-IS-TE.

Reference is now made to FIG. 5, which is a diagram of a subobject 42, which is constructed and operative in accordance with a disclosed embodiment of the invention. The subobject 42 is substituted for the subobject 30 (FIG. 3) in a path message. The subobject 42 includes fields for a RPR IP address 44 of the sending node in place of the router ID 32 (FIG. 3) and a direction indicator 46 in place of the interface ID 34.

Referring again to FIG. 1 and FIG. 5, suppose that using the RSVP-TE protocol, it is desired to establish a clockwise MPLS tunnel 48 (FIG. 1) between the node 12 and the node 16 on the clockwise-directed ringlet 20, which exits the node 12 through its west interface 50, and enters the node 16 via its east interface 52. It is assumed that the nodes 12, 16 have been assigned RPR IP addresses IprprA and IprprC, respectively. The subobject 42 (FIG. 5) is populated with information specific to the nodes 12, 16 as described above, and is included in an ERO. This ERO is included in a path message, which is transmitted from the node 12 to the node 16. At the node 16, the ERO undergoes either strict or loose RSVP processing. Alternatively, the ERO could specify a different node, having an address such as IprprB, and could specify that the tunnel use the east interface of the node 12.

Figure 6:
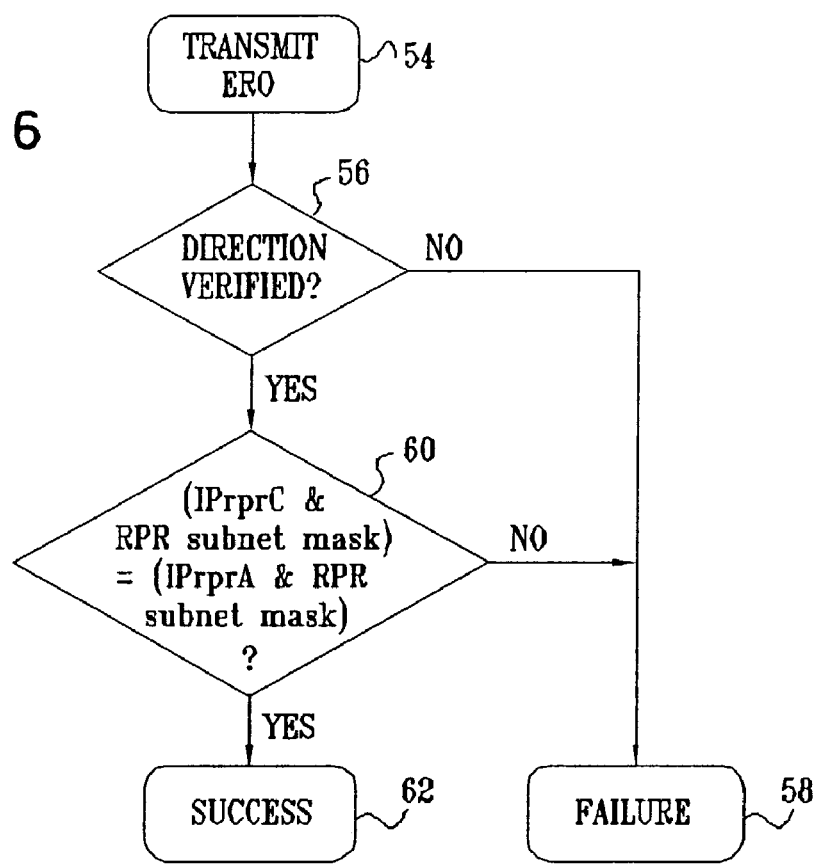
FIG. 6 is a flow-chart illustrating strict processing of an ERO according to a disclosed embodiment of the invention.

Reference is now made to FIG. 6, which is a flow chart illustrating a method of strict processing of an ERO according to a disclosed embodiment of the invention. Strict processing is elected when the path message is expected to be received from a particular ringlet. The method is disclosed with reference to the example of FIG. 1, and further with reference to FIG. 5.

The process begins at initial step 54, in which an ERO is configured as described above, and transmitted in a path message from the node 12 to the node 16 along the clockwise-directed ringlet 20. It should be noted that due to the multi-access nature of RPR, the node 14 does not receive the packet that includes the path message in its protocol stack, and therefore ignores it.

Next at decision step 56, a determination is made by the node 16 whether the path message transmitted in initial step 54 was received on the clockwise-directed ringlet 20 via the east interface 52. This step guarantees that only messages reaching the node 16 in the designated direction are to be processed.

If the determination at decision step 56 is negative, then the process fails at final step 58.

If the determination at decision step 56 is affirmative, then control proceeds to decision step 60. In decision step 60, a logical AND operation is performed by the node 16 on the RPR IP address of the node 16 and the RPR subnet mask (IPrprC & RPR subnet mask). A logical AND operation is also performed by the node 16 on the RPR IP address of the node 12, which was received in the ERO that was transmitted in initial step 54, and the RPR subnet mask (IPrprA & RPR subnet mask). Both results are now compared, and a determination is made whether the two logical AND operations yield equal results.

If the determination at decision step 60 is negative, an error has occurred, and control proceeds to final step 58.

If the determination at decision step 60 is affirmative, then control proceeds to final step 62, where strict processing ends successfully. Establishment of a LSP can now proceed.

Figure 7:
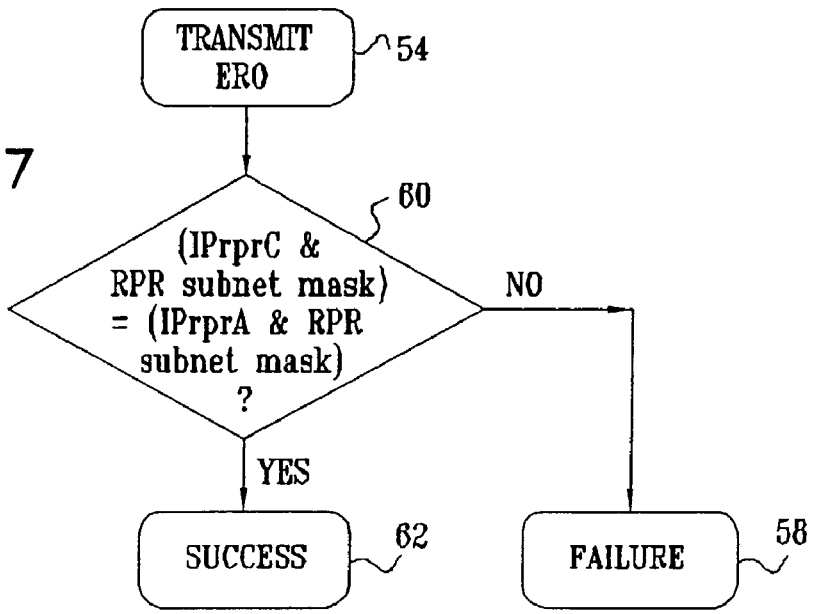
FIG. 7 is a flow chart illustrating loose processing of an ERO according to a disclosed embodiment of the invention.

Reference is now made to FIG. 7, which is a flow chart illustrating a method of loose processing of an ERO according to a disclosed embodiment of the invention. The method is disclosed with reference to the example of FIG. 1, and further with reference to FIG. 5. The method in FIG. 7 has steps in common with the flow chart of FIG. 6, the disclosures of which are not generally repeated in the interest of brevity. Loose processing is typically performed when the path message is allowed to be received via either of a node's east and west interfaces, and it is not required to check for consistency as to the direction traveled by the received path message.

Initial step 54 is performed as disclosed above. Control then proceeds directly to decision step 60. In the example of FIG. 1, it is simply assumed the traffic will be received from the east as indicated by the direction indicator 46 (FIG. 5) that was assigned by the node 12.

If the determination at decision step 60 is negative, then loose processing fails at final step 58. Otherwise, control proceeds to final step 62, in which loose processing ends successfully.

Figure 8:
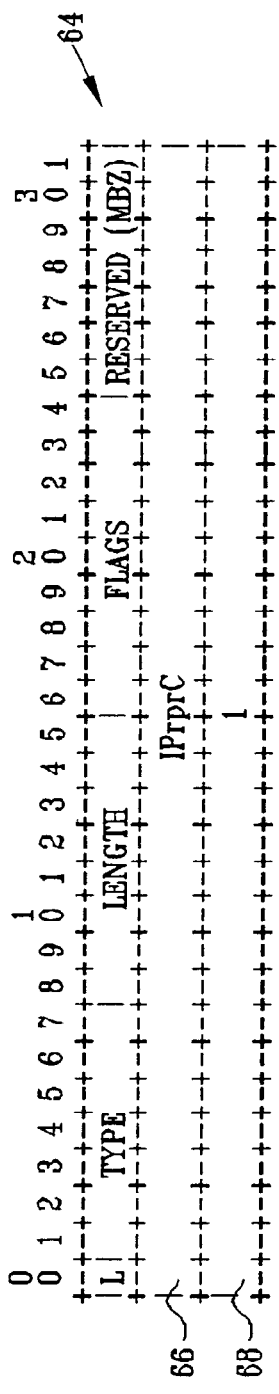
FIG. 8 is a diagram of a subobject of a RRO according to a disclosed embodiment of the invention.

Reference is now made to FIG. 8, which is a diagram of a TLV-encoded subobject 64 of an unnumbered RRO according to a disclosed embodiment of the invention. The description of FIG. 8 should be read in conjunction with FIG. 1. The RRO is defined generally in the above-noted document RFC-3036, and is optionally requested in the path message. If such a request exists, it appears twice: once in the path message generated by the generating node (node 12) to the receiving node (node 16) (FIG. 1) and once in the Resv message returned by the receiving node (node 16) to the generating node (node 12). The subobject 64 includes fields for a RPR IP address 66 of the generating node and a direction indicator 68. The subobject 64 is appended to a RRO, thereby creating a modified RRO. In the above-noted path message, the RPR IP address 66 is that of the node creating the object (node 12). The direction indicator 68 is set to the value 0, indicating that the actual traffic is expected to be sent from the eastbound interface of the generating node (west interface 50), traveling along the clockwise-directed ringlet 20 (FIG. 1). In the above-noted Resv message, the RPR IP address 66 is that of the node creating the object, (node 16). The direction indicator 68 is set to the value 1, indicating that the actual traffic is expected to be received from the eastbound interface of the node 16 (east inter-face 52), traveling along the counterclockwise-directed ring-let 22.

In the case of the RRO, whether it is included in a path message or in a Resv message, one of the procedures disclosed with reference to FIG. 6 and FIG. 7 is performed. It will be noted that the identities of the sending node and receiving node are different. The details of these methods are not repeated.

Figure 9:
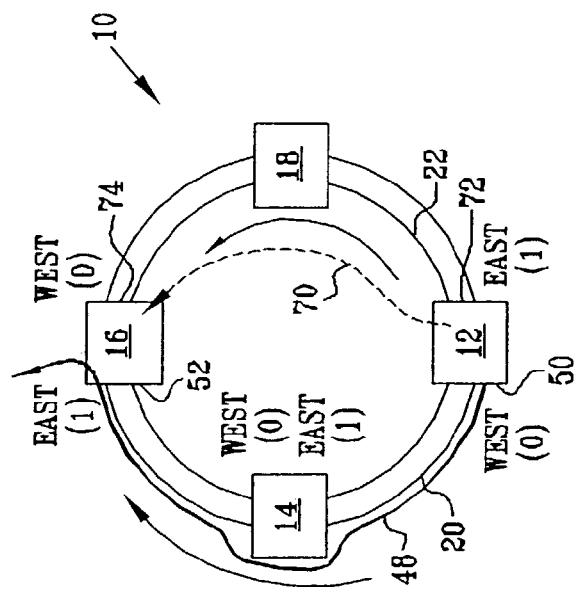
FIG. 9 is a diagram of the RPR network similar to FIG. 1, with the addition of a route that is followed by a path message.

Reference is now made to FIG. 9, which is a diagram of the RPR network 10 similar to FIG. 1, with the addition of a signaling packet route 70 that is followed by a path message from the node 12 to the node 16. The route 70 is westbound along the counterclockwise-directed ringlet 22, leaving the node 12 via its east interface 72 and entering the node 16 through its west interface 74. Assuming that the subobjects in the path message are configured identically as described above in the discussion of FIG. 6 and FIG. 7, if loose processing is in force, the path message would be accepted by the node 16. Actual data follows the path from the node 12 to the node 16 in the clockwise-direction along the clockwise-directed ringlet 20 in the same manner as was disclosed above in the discussion of the ERO object. However, if strict processing is in effect, the path message would be rejected by the node 16.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for establishing a data-link service, comprising the steps of:
    configuring a Resilient Packet Ring (RPR) in a data network, said ring comprising a plurality of ringlets for network traffic passing therethrough, said ring further comprising a plurality of nodes including a first node and a second node, said nodes having a plurality of interfaces for ingress and egress of said network traffic along said ringlets, said interfaces comprising message-transmitting interfaces and message-receiving interfaces;
    assigning respective interface identifiers to said interfaces, said interface identifiers comprising a RPR internet protocol (IP) address comprising a common IP address and a common subnet for each of said nodes;
    preparing a first Resource Reservation Protocol (RSVP) signaling message comprising an unnumbered explicit route object that includes said RPR IP address of said first node and a direction indicator of a specified traffic direction for said network traffic through a tunnel to be established via one of said ringlets between said first node and said second node;
    transmitting said first RSVP signaling message from said first node via one of said message-transmitting interfaces thereof to said second node;
    responsively to said first RSVP signaling message, returning a second RSVP signaling message from said second node to said first node, said second RSVP signaling message comprising said direction indicator of said explicit route object;
    responsively to receipt of said second RSVP signaling message in said first node, establishing said tunnel on said one of said ringlets; and
    routing said network traffic through said tunnel in said specified traffic direction.

2. The method according to claim 1, further comprising the step of performing a logical test in said second node to verify compatibility between said RPR IP address in said explicit route object and said RPR IP address of one of said message-receiving interfaces of said second node.

3. The method according to claim 1, further comprising the steps of verifying that said first RSVP signaling message was received at said second node in said specified traffic direction.

4. A Resilient Packet Ring (RPR ring) in a communications network, comprising:
    a plurality of ringlets for network traffic passing therethrough; and
    a plurality of nodes including a first node and a second node, said nodes comprising a router and a plurality of interfaces for ingress and egress of said network traffic along said ringlets, said interfaces comprising message-transmitting interfaces and message-receiving interfaces, respective interface identifiers being assigned to said interfaces, said interface identifiers comprising a RPR internet protocol (IP) address comprising a common IP address and a common subnet for each of said nodes, wherein said nodes are operative, responsively to a request to initiate a tunnel via one of said ringlets between said first node and said second node, for preparing a first Resource Reservation Protocol (RSVP) signaling message comprising an unnumbered explicit route object that includes said RPR IP address of said first node and a direction indicator of a specified traffic direction for said network traffic through said tunnel, transmitting said first RSVP signaling message from said first node via one of said message-transmitting interfaces thereof to said second node, responsively to said first RSVP signaling message, returning a second RSVP signaling message from said second node to said first node, said second RSVP signaling message comprising said direction indicator of said explicit route object, responsively to receipt of said second RSVP signaling message in said first node, establishing said tunnel on said one of said ringlets and routing said network traffic through said tunnel in said specified traffic direction.

5. The RPR ring according to claim 4, wherein said second node is operative to perform a logical test in said second node to verify compatibility between said RPR IP address in said explicit route object and said RPR IP address of one of said message-receiving interfaces of said second node.

6. The method according to claim 4, wherein said second node is operative for verifying that said first RSVP signaling message was received at said second node in said specified traffic direction.

\* \* \* \* \*